Feb. 25, 1964 L. LEWIS 3,122,458
GRAIN REFINEMENT OF URANIUM BILLETS
Filed May 24, 1962 3 Sheets-Sheet 1

INVENTOR.
LAWRENCE LEWIS
BY

Feb. 25, 1964 L. LEWIS 3,122,458
GRAIN REFINEMENT OF URANIUM BILLETS
Filed May 24, 1962 3 Sheets-Sheet 2

INVENTOR.
LAWRENCE LEWIS
BY

Feb. 25, 1964 L. LEWIS 3,122,458
GRAIN REFINEMENT OF URANIUM BILLETS
Filed May 24, 1962 3 Sheets-Sheet 3

INVENTOR.
LAWRENCE LEWIS
BY 3,122,458
GRAIN REFINEMENT OF URANIUM BILLETS
Lawrence Lewis, Bridgeport, Conn., assignor to the United States of America as represented by the United States Atomic Energy Commission
Filed May 24, 1962, Ser. No. 197,546
3 Claims. (Cl. 148—11.5)

This application is a continuation-in-part of my copending application Serial No. 51,243, filed August 22, 1960, for "Grain Refinement of Uranium Billets," now abandoned.

The present invention relates generally to uranium metallurgy and in particular to a new and superior method of treating cast uranium billets to produce a fine grained, equiaxed, randomly oriented structure in the billet in preparation for further forming operations, such as extrusion into rods and tubes, rolling and the like.

It is well known that uranium having a fine grained, equiaxed, randomly oriented grain structure is preferred for nuclear reactor use, and a large amount of research has been conducted in an effort to achieve this result. Heretofore some grain refinement has been secured by heating cast uranium to a temperature in the beta range, rapidly quenching it, and subsequently annealing in the alpha temperature range. The effect of these operations is to randomize the grain structure as a result of the beta heat treatment. Annealing in the alpha range serves to recrystallize the uranium. It has been found that the faster the rate of cooling in the quenching step, the finer the grain size resulting from the anneal and the more rapid the rate of recrystallization. While this treatment wil provide a completely uniform grain size in thin sections, in larger samples, of one-inch diameter and more, there is a gradient in grain size which increases from the surface to the center. This process is therefore incapable of producing a fully refined equiaxed grain structure in massive bodies of uranium such as uranium billets. As to these, therefore, resort has been had to forging in order to effect grain refinement. This operation is both expensive and not completely satisfactory since use of such material in further technological operations, such as extrusion and co-extrusion, has resulted in erratic behavior, whereas uranium refined by the process of this invention has yielded consistent results and is of especial importance in solving the difficult problem of extruding thin-walled uranium tubing.

It is an object of this invention to provide a method of producing fully refined, equiaxed, fine grained uranium billets.

The foregoing object is obtained by heating the uranium billets to the beta-range, rapidly quenching in brine, re-heating and annealing in the alpha phase and finally subjecting them to extrusion upset in the alpha phase. The first three steps of the process condition the coarse, as-cast billet structure by partially refining it. The final extrusion upset step effects a minor amount of hot working which suffices to achieve overall refinement of the billet. Thus, the billet is converted to the desired fine grained, randomly oriented, equiaxed structure without resort to the costly forging formerly employed for this purpose.

It is a further object of this invention to provide a method of producing fully refined, equiaxed, fine grained tubular uranium billets from solid, cast billets. This further object is achieved by the addition of two steps to the process described supra: namely, a first piercing operation to form a tubular billet and a final alpha phase annealing step to eliminate an undesirable, coarse grained ring produced at the inner diameter of the tubular billet as a result of the piercing step.

The improvement achieved by this invention may be readily seen by comparison of the attached photomacrographs wherein—

Figure 3:
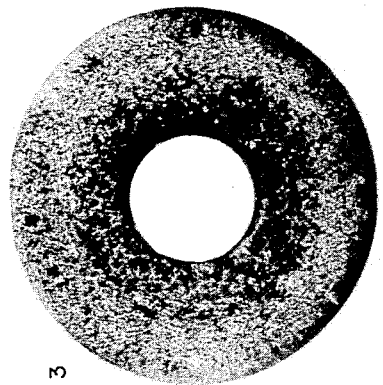
FIG. 3 is a section taken from the end of a beta-quenched billet.
Figure 2:
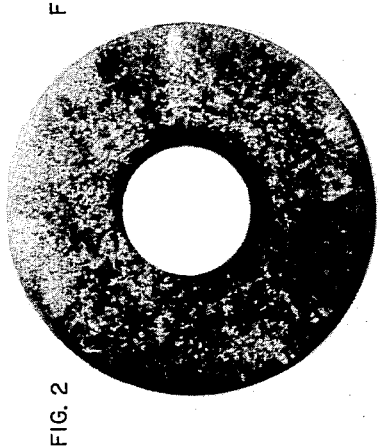
FIG. 2 is a section taken from the middle of a beta-quenched billet.
Figure 1:
FIG. 1 is a typical transverse photomacrograph of an as-cast billet.

An examination of the figures reveals the typical coarse grain structure of an as-cast hollow billet as shown in FIG. 1. Beta-quenching of the billet will cause some grain refinement as shown in FIGS. 2 and 3. In this regard, it is to be noted that the structure of FIG. 3 is superior in fineness to that of FIG. 2. This results from faster cooling imposed by the quench at the end as compared with the middle section of the billet.

Figure 5:
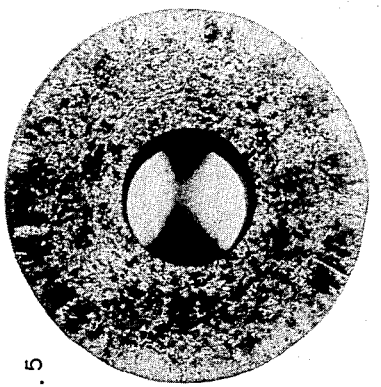
FIG. 5 is a similar section from a billet annealed at 600° C. (1112° F.) in the alpha-phase.
Figure 4:
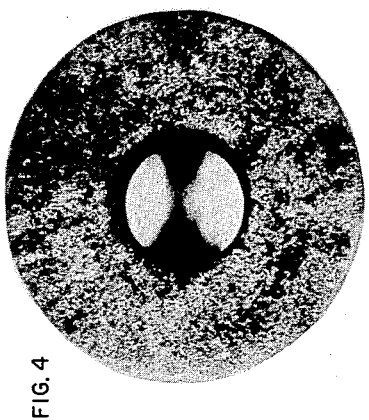
FIG. 4 is a section from a beta-quenched billet that has been annealed at 635° C. (1175° F.) in the alpha-phase.

FIGS. 4 and 5 show the results of annealing the quenched billets in the alpha-phase at two temperatures. It is observed that greater refinement is present in the billet annealed at 635° C. (1175° F.). No discernible effect was brought about by time at temperature.

Figure 6:
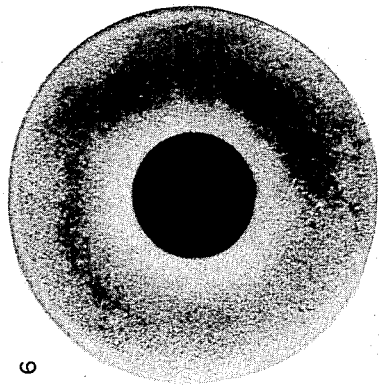
FIGS. 6–8 are photomacrographs of unextruded butt sections of billets that were beta-quenched, alpha-phase annealed at 635° C. (1175° F.) for 1, 2 and 4 hours respectively, and then subjected to extrusion upset amounting to a 5% change in area at a temperature of 635° C. (1175° F.)
Figure 9:
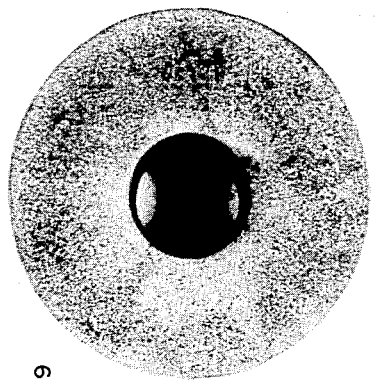
FIGS. 9–11 are photomacrographs of specimens similar to FIGS. 6–8 but which were annealed at 600° C. (1112° F.) for 1, 2 and 4 hours respectively before extrusion upset.
Figure 12:
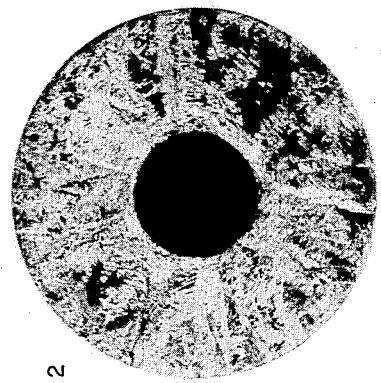
FIG. 12 is a photomacrograph of the unextruded butt section of a billet which was not heat treated.
Figure 8:
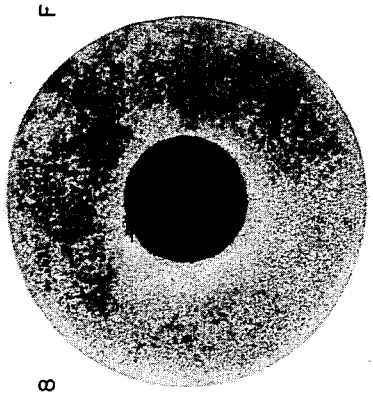
Figure 11:
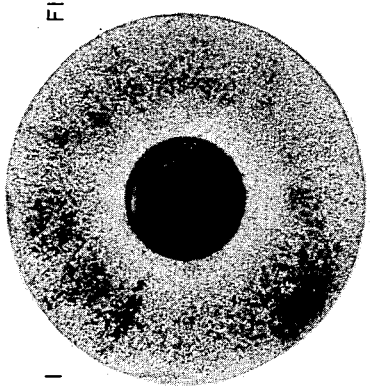
Figure 7:
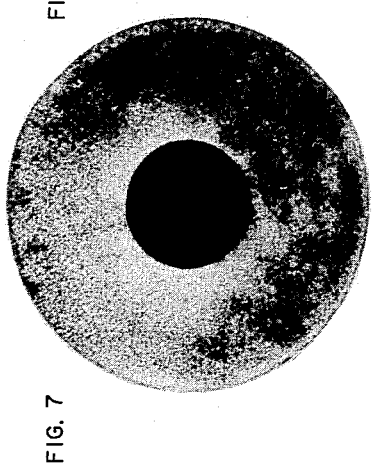
Figure 10:
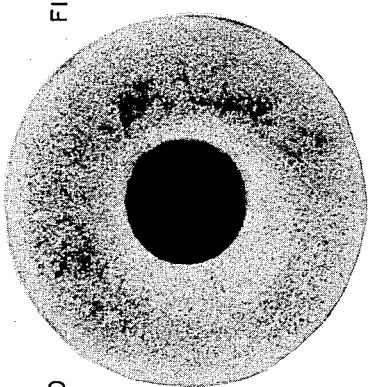

FIGS. 6–8 exhibit complete grain refinement while FIGS. 9–11, although showing some further refinement, are somewhat inferior to the billets annealed at 645° C. (1175° F.). FIG. 12, in contrast, exhibits a facsimile of the original as-cast structure depicted in FIG. 1.

FIGS. 4 and 5 reveal the limitations of the grain refining capabilities of a beta-quench and alpha-anneal. It is, however, evident that extrusion upset in the alpha range amounting to a 5% change in area provides the impetus for complete grain refinement. Retention of an as-cast structure in the butt section of conventionally extruded billets (FIG. 12) indicates that total grain refinement cannot be achieved without a beta-quench. The latter appears to condition the billet through partial refinement, thereby lessening the activation energy necessary upon upset to produce complete refinement. Further, it is evident that temperature plays an important role, with greater refinement possible at an alpha phase anneal and extrusion upset temperature of 635° C. (1175° F.).

The process of this invention may be understood in greater detail by the following specific examples in which totally grain refined uranium billets were produced from cast hollow billets.

*Billet Heat Treatment*

Twenty cast hollow billets measuring 7 5/16 in. O.D. x

2⅝ in. I.D. x 21 in. long and weighing about 450–500 pounds each comprised the starting material. The heat treatment consisted of beta-treating all but two billets at 760° C. (1400° F.) for one hour by immersion in commercial heat treating salt bath. The billets were then quenched in a tank containing a dilute brine solution. Transfer times from the furnace to the quench tank were held to less than thirty-one seconds, and preferably to a period not exceeding 25 seconds. In any event, the transfer must be accomplished fast enough to assure that the billet is still in the beta temperature range at the time it is immersed in the brine quench. It is the purpose of the beta-heat treatment and brine quench to condition the coarse, as-cast billet structure by partial refinement for subsequent overall refinement.

Transverse slices were cut from one representative billet to depict the structure at the end and middle of a beta-quenched billet (FIGS. 2 and 3).

The billets were then equally divided into two groups, those to be alpha-phase annealed at 635° C. (1175° F.) and (1112° F.). Billets were heated in triplicate at each temperature for 1, 2 and 4 hours. The first two of each series were extruded and the third reserved for metallographic examination. The heating in the high alpha range is a necessary prerequisite in the grain refining process and has the added advantage of concurrently annealing the billet. A definite refinement of the inner and outer diameter perimeters is noticeable at this stage (FIGS. 4 and 5), the depth of the refinement is, however, limited to about 1½ inches below the surface of the billet.

Extrusion Upset

The final step in the grain refinement process is extrusion upset in the alpha range. This brings about total refinement of the billet through a minor amount of hot work amounting to about a 5% change in area of the billet. Extrusion was carried out at temperatures of 635° C. (1175° F.) and 600° C. (1112° F.) using pressures of 2000 p.s.i. to 2700 p.s.i. and at a ram speed of 30 inches per minute. A 3.150 in. I. D. high speed tool steel die and a 2.450 in. O.D. tool steel mandrel were used to extrude bare uranium tubing having nominal dimensions of 3.120 in. O.D. and 2.425 in. I.D. Tubing so produced was further machined to remove surface defects. Representative butt sections from the extrusion were secured and provided the photomacrographs illustrated in FIGS. 6–11 inclusive.

The foregoing procedure has been employed to produce fine grained, pre-formed billets and billets with specially contoured front and rear ends for further processing such as rolling, roll-piercing and the like. In preparing billets for such use, a blank die and suitable liner are used for the upset step, with the billet being ejected from the liner after upset. Where tubing is desired, however, the billet instead of being ejected from the liner after upset, is extruded directly into tubing as in the examples described above.

The foregoing example utilized an as-cast hollow uranium billet as the starting material. Such billets are more costly than solid billets. However, pierced solid billets have not been used in the process since the piercing operation produces an undesirable coarse grained ring at the inner diameter of the billet. The presence of this ring raised doubts as to the performance of the billet in subsequent forming operations such as co-extrusion. It has been found, for example, that a coarse or irregular grain structure leads to an undesirable serrated core-cladding interface. This difficulty is overcome by the present method, by means of an alpha phase anneal at the end of the process which effects overall refinement and eliminates the coarse grained ring heretofore mentioned. The method as applied to solid uranium billets may be more fully understood by reference to the following specific example:

Piercing

Figure 13:
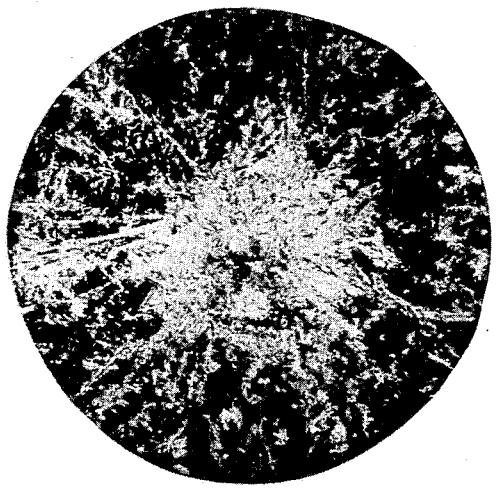
FIGS. 13 and 14 are respectively cross sections showing the typical as-cast macrostructure of a solid billet used as starting material in this process, and the typical refined macrostructure of a billet that has been pierced and treated in accordance with this invention.

A solid uranium billet (FIG. 13) approximately 7⅛" in diameter and 21" long was pierced using conventional metal billet piercing means at a temperature of approximately 635° C. (1175° F.) to produce a hollow billet having a central passage 2" in diameter. The pierced billet was cooled in water to prevent excessive oxidation.

Billet Heat Treatment and Extrusion Upset

The billet was next given a triple heat treatment at 760° C. (1400° F.) for a minimum of one hour. The heated billet was transferred in 25 seconds or less to a dilute brine solution held at 38° C. (100° F.) and quenched vertically and with agitation for five minutes before removal. The purpose of this operation is to condition the billet for overall refinement by breaking up the coarse, as-cast grain structure.

The billet was next annealed in the alpha temperature range at a temperature of about 635° C. (1175° F.) for one hour, and then upset in an extrusion liner to an extent sufficient to increase the cross sectional area of the billet by at least 5%. The extrusion upset is accomplished at a temperature of about 635° C. (1175° F.) by applying a pressure of about 2000 p.s.i. either steadily or intermittently for a period of about two minutes. In this example, the outer diameter of the billet was increased by ½" to 7⅝" by the upsetting step. After upset, the billet was ejected from the liner and cooled in water to prevent excessive oxidation.

The heat treating, annealing and extrusion upset steps are essentially the same as those used to condition billets prepared from hollow as-cast billets. However, in the case of pierced billets, a final step is required to remove the ring of coarse grained metal resulting from the piercing operation.

Final Annealing

Figure 14:
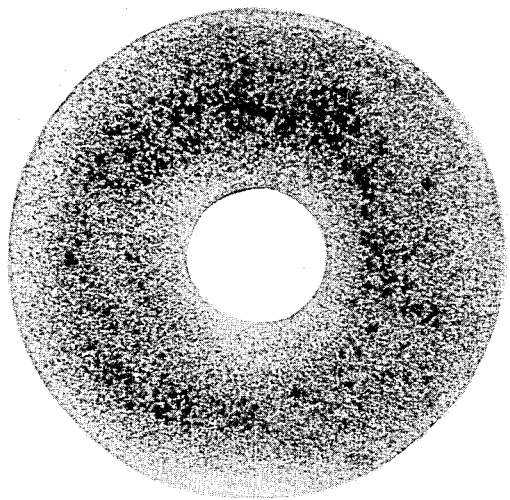

The billet is finally annealed in the alpha range at a temperature of about 635° C. (1175° F.) for a period of about two hours. The billet is then quenched in fresh water again to prevent excessive oxidation. This final annealing step produces overall grain refinement in the tubular billet as shown in FIG. 14, and eliminates the ring at the inner diameter which was caused by the piercing step. The billet so produced may be directly extruded into thin walled uranium tubing.

As solid cast uranium billets are less costly than hollow cast billets, a saving is achieved in using the former as the starting material, notwithstanding the need for piercing the billets and giving them a final anneal in the alpha phase.

While a triple beta quench is preferred, a single quench is also effective in heat treating the pierced billet. The times and temperatures for the heat treatments likewise are not critical but have been found to be optimum in this process.

By the present invention, totally grain refined, equiaxed, randomly oriented massive tubular uranium billets have been produced from both solid and hollow cast stock by a method consisting of heat treatment in the beta-range, rapid quenching, annealing in the alpha phase and finally extrusion upset in the alpha phase to an extent amounting to at least a 5% change in area of the billet. Billets produced by this method are superior to those refined by hot forging. It has been found that hot forging is not wholly reliable in that total billet refinement is not always achieved. In addition, forged billets have produced dimensionally unstable rods, particularly at low extrusion ram speeds. These defects, coupled with the high cost of forging, render the present method especially desirable.

I claim:

1. The method of producing uranium billets having a totally refined, randomly oriented, equiaxed grain structure from cast uranium billets, that consists of the steps of:

(a) beta-quenching the billets by heating the same at a temperature of approximately 760° C. for approximately one hour, transferring the heated billets to a brine quench, maintaining the billets in the beta temperature range during said transfer, and immersing the billets in the brine quench to effect rapid cooling of the billets through the beta-alpha transformation point;

(b) alpha phase annealing of the quenched billets by heating the billets at a temperature of approximately 635° C. for at least one hour; and (c) extrusion upset of the billet in the alpha temperature range by upsetting the billet at a temperature of approximately 635° C. to an extent sufficient to cause at least a 5 percent increase in cross sectional area of the billets, whereby uranium billets having a totally refined, randomly oriented equiaxed grain structure are produced.

2. The method of producing massive tubular uranium billets having a totally refined, randomly oriented, equiaxed grain structure from solid as-cast uranium billets, that consists of the steps of:

(a) piercing the as-cast billets to produce tubular billets;

(b) beta quenching the billets by heating the same to a temperature within the beta temperature range of uranium, transferring the billets to a brine quench, maintaining the billets at a temperature within the beta temperature range of uranium during said transfer, and immersing the billets in the brine quench to effect rapid cooling of the billets through the beta-alpha transformation point;

(c) alpha phase annealing of the quenched billets by heating the billets at a temperature of approximately 635° C. for at least one hour;

(d) extrusion upset of the billets in the alpha temperature range by upsetting the billets at a temperature of approximately 635° C. to an extent sufficient to cause at least a 5 percent increase in cross sectional area of the billets, followed by cooling the billets in water; and (e) again annealing the billets by heating them at a temperature within the upper alpha temperature range of uranium for approximately two hours followed by quenching in water to prevent excessive oxidation of the billets and produce tubular billets having a totally grain refined, randomly oriented equiaxed grain structure.

3. The method of claim 2 wherein the beta quenching step is repeated three times.

References Cited in the file of this patent

UNITED STATES PATENTS 2,830,921　　Creutz _____ Apr. 15, 1958
2,877,149　　Kaufmann _____ Mar. 10, 1959

OTHER REFERENCES

Finniston et al.: Metallurgy and Fuels Series V of "Progress in Nuclear Energy," 1956 (pages 90–91 relied upon).